United States Patent
Kim et al.

(10) Patent No.: US 9,363,424 B2
(45) Date of Patent: Jun. 7, 2016

(54) CAMERA MODULE HAVING A GUIDE UNIT

(71) Applicant: LG INNOTEK CO., LTD., Seoul (KR)

(72) Inventors: Hyun Jun Kim, Seoul (KR); Tae Min Ha, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/409,368

(22) PCT Filed: Jan. 30, 2013

(86) PCT No.: PCT/KR2013/000731
§ 371 (c)(1),
(2) Date: Dec. 18, 2014

(87) PCT Pub. No.: WO2014/025109
PCT Pub. Date: Feb. 13, 2014

(65) Prior Publication Data
US 2015/0326768 A1    Nov. 12, 2015

(30) Foreign Application Priority Data
Aug. 8, 2012 (KR) .................. 10-2012-0086569

(51) Int. Cl.
*H04N 5/225* (2006.01)
*G03B 17/02* (2006.01)
*G02B 7/02* (2006.01)

(52) U.S. Cl.
CPC ............... *H04N 5/2254* (2013.01); *G02B 7/02* (2013.01); *G03B 17/02* (2013.01); *H04N 5/2252* (2013.01); *H04N 5/2257* (2013.01)

(58) Field of Classification Search
CPC . H04N 5/2257; H04N 5/2252; H04N 5/2254; G02B 7/02; G03B 17/02
See application file for complete search history.

(56) References Cited

U.S. PATENT DOCUMENTS

| | | | | |
|---|---|---|---|---|
| 6,654,064 | B2 * | 11/2003 | Ishikawa | H01L 27/14618 250/239 |
| 7,009,654 | B2 * | 3/2006 | Kuno | G02B 7/02 257/E31.117 |
| 7,046,296 | B2 * | 5/2006 | Shinomiya | H01L 27/14618 348/340 |
| 7,171,745 | B2 * | 2/2007 | Mostafazadeh | H05K 3/325 29/832 |
| 7,262,405 | B2 * | 8/2007 | Farnworth | H01L 27/14618 250/208.1 |
| 7,714,931 | B2 * | 5/2010 | Singh | H01L 27/14618 348/374 |
| 7,744,296 | B2 * | 6/2010 | Wu | G03B 17/00 348/374 |
| 2001/0010562 | A1 * | 8/2001 | Nakagishi | H04N 5/2253 348/374 |

(Continued)

FOREIGN PATENT DOCUMENTS

| | | |
|---|---|---|
| JP | 2005-193053 A | 7/2005 |
| KR | 10-2005-0000723 A | 1/2005 |
| KR | 10-2008-0081726 A | 9/2008 |

(Continued)

*Primary Examiner* — Nicholas Giles
(74) *Attorney, Agent, or Firm* — Birch, Stewart, Kolasch & Birch, LLP

(57) ABSTRACT

The camera module according to an embodiment of the present invention including: a printed circuit board on which an image sensor is mounted; a holder member installed on the printed circuit board; a lens module located in the holder member; and a guide unit formed protruding from the surface of the holder member opposite to the image sensor.

13 Claims, 1 Drawing Sheet

(56) References Cited

U.S. PATENT DOCUMENTS

| | | | |
|---|---|---|---|
| 2002/0057468 A1* | 5/2002 | Segawa | H01L 27/14618 358/509 |
| 2004/0094825 A1* | 5/2004 | Onishi | H01L 27/14618 257/666 |
| 2005/0179805 A1 | 8/2005 | Avron et al. | |
| 2005/0251050 A1 | 11/2005 | Groot | |
| 2008/0279547 A1* | 11/2008 | Wu | G03B 17/00 396/529 |
| 2010/0053423 A1* | 3/2010 | Singh | G03B 19/00 348/374 |
| 2011/0134303 A1* | 6/2011 | Jung | H01L 27/14618 348/340 |

FOREIGN PATENT DOCUMENTS

| | | |
|---|---|---|
| KR | 10-2010-0009410 A | 1/2010 |
| KR | 10-0958102 B1 | 5/2010 |

* cited by examiner

CAMERA MODULE HAVING A GUIDE UNIT

TECHNICAL FIELD

The invention relates to camera module.

BACKGROUND ART

Recently, demands of using a miniature camera module have been greatly increased due to wide application areas including various multimedia areas such as tablet personal computer, camera phone, PDA, smart phone, and including a further use for image input equipments such as CCTV or information terminals of a video tape recorder. More particularly, the smart phone has been shown a recent trend that requires a development for a tiny camera module due to increased demand for consumer's preferred compact design.

The camera module is manufactured using an image sensor such as CCD (Charge Coupled Device) or CMOS (Complementary Metal Oxide Semiconductor), wherein An image is transferred to display an object to a display media such as LCD display device by concentrating light hitting the object through lens inside the sensor, hereby converting the light energy into an electric energy.

By the way, the camera module may not be operated accurately when an optical axis between an image sensor fixed on a printed circuit board and a lens module is not arranged to be concentric or is arranged to be concentric but the image sensor and the lens module are assembled under a tilting situation.

DISCLOSURE OF INVENTION

Technical Problem

The purpose of the present invention is to provide a camera module with an improved structure so as to accurately arrange an optical axis, as well as to improve its assembly.

Solution to Problem

According to an embodiment of the present invention, a camera module including: a printed circuit board on which an image sensor is installed; a holder member installed on the printed circuit board; a lens module located in the holder member; and a guide unit formed protruding from a surface of the holder member which is opposite to the image.

The guide unit may be formed in a body with the holder member, or may separately be formed as an additional member.

The holder member can include a mounting portion to insert the image sensor.

The mounting portion can have a height corresponding to one of the image sensor.

The guide unit can include a guide protrusion protruding from an inner wall surface of the mounting portion, wherein the guide protrusion comprises a slope to a direction that the image sensor is inserted.

Multiple guide protrusions can be formed to be symmetric with respect to a central axis of the holder member.

The mounting portion can be formed in a hexahedral shape and includes four inner wall surfaces, wherein at least one of the guide protrusions can be installed at, at least, one of the inner wall surfaces.

Also, the mounting portion includes a support surface opposite to a sensing surface of the image sensor, wherein the support surface has a surface contact with the sensing surface of the image sensor.

Adhesive then bonds the support surface or an elastic member is interposed between the support surface and the sensing surface of the image sensor.

The support surface can be divided by a portion installed with the mounting portion and the lens module The lens module is inserted and coupled to other side of the mounting portion of the holder member.

At least one lens is installed in the lens module.

Advantageous Effects of Invention

It is possible to protect a drawback that an optical axis between an image sensor and a lens module is not arranged to be concentric or is arranged to be concentric but the image sensor and the lens module are assembled under a tilting situation, resulting in bad assembly, since an arrangement for the optical axis between the image sensor and the lens module can be accurately performed and the image sensor and the lens module can be assembled more precisely.

BEST MODE FOR CARRYING OUT THE INVENTION

Hereafter, an embodiment of the present invention will be described with reference to the accompanying drawings.

Figure 1:
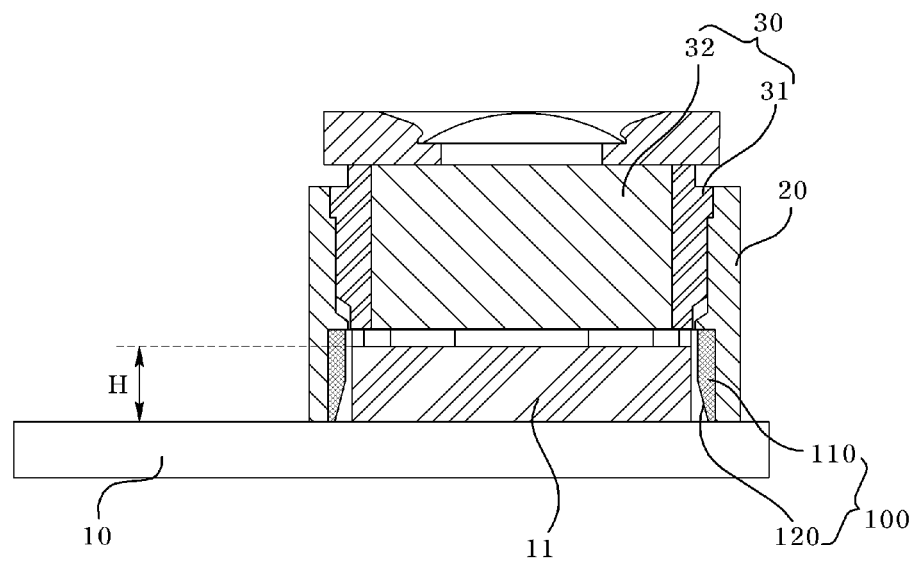
FIG. 1 is a cross-sectional perspective view of a camera module according to an embodiment of the present invention.
Figure 2:
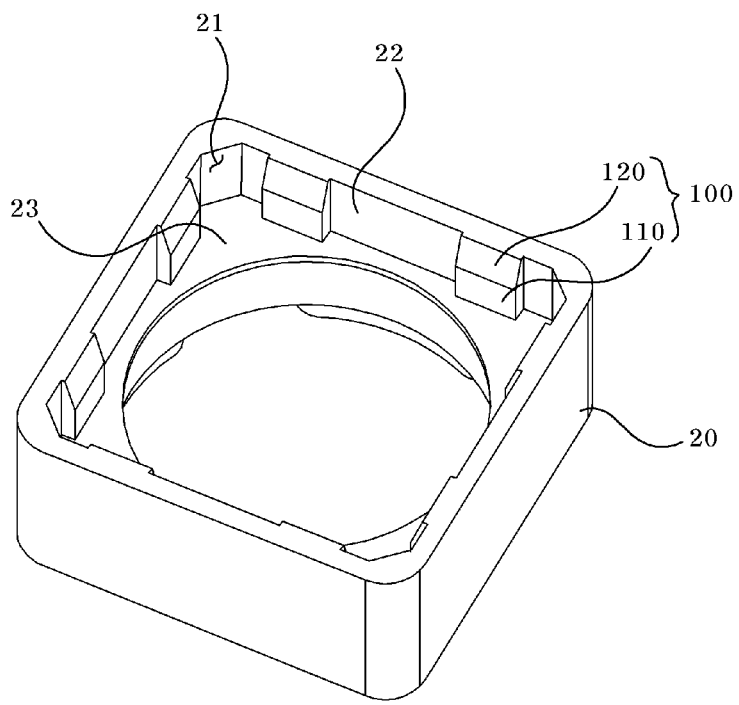
FIG. 2 is a perspective view of a holder member.

FIG. 1 is a cross-sectional perspective view of a camera module according to an embodiment of the present invention, and FIG. 2 is a perspective view of a holder member according to an embodiment of the present invention.

A camera module according to an embodiment of the present invention, as shown in FIG. 1, includes a printed circuit board (10), a holder member (20), a lens module (30) and a guide unit (100).

Image information can be read through an image sensor installed very close to the center of the printed circuit board. The image sensor (11) can be mounted on a surface of the printed circuit board (10) using a solder ball or a wire bonding, and the like.

A holder member (20) can be inserted and coupled on an upper side of the printed circuit board (10), as shown in FIG. 1, wherein the image sensor (11) can be inserted and coupled at one side of the holder member (20), the lens module (30) can be coupled at other side (20). The holder member (20) can be formed through an injection molding using a resin material and formed in a shape corresponding to one of the image sensor (11) and lens module (30). Also, a through-hole can be formed at a center of the holder member in order that a light penetrating through the lens module (30) can be transferred to the image sensor (11).

The lens module (30) which is coupled to the holder member (20), includes at least one lens (32) inside a lens barrel (31) that is in a cylindrical shape. Also, an actuator which provides auto-focus and/or hand-shake correction functionality is capable to be installed at upper side, lower side or the inside of the lens module (30), or at upper side, lower side or the inside of the holder member, as needed. In general, the lens module (30) can be formed through an injection molding using a resin material and may be screwed and coupled to the holder member (20) including a formation of a screw thread, if not shown in the accompanying drawings. Also, the lens (32) may be coupled directly to the holder member (20).

Additional optical apparatus such as a shutter unit or aperture may be installed in the lens module (30). In other words, at least one lens can be sequentially arranged in the lens module (30), wherein when a total of two lenses are arranged in the lens module (30), the optical apparatus comprised of the aperture and shutter may be installed in a space between the two lenses, between the lenses and an actuator, or at an upper side or a lower side of the outermost lens of the two lenses. The above layout-structure can be varied depending on product's design and configuration of a camera unit.

As shown in FIG. 2, a guide unit (100) can be arranged in the holder member (20) and comprises a guide protrusion (110) and a slope (120). The guide unit (100) may be formed in a body with the holder member (20) or may separately be formed as an additional member.

The guide protrusion (110) can be formed protruding from an inner wall surface of the mounting portion (21)-side, wherein the image sensor (11) can be inserted in the mounting portion (21) of the holder member (20). According to an embodiment of the present invention, the mounting portion (21) is formed in a hexahedral shape and includes a total of four inner wall surfaces, wherein at least one of all the guide protrusions (110) can be installed at, at least, one of the inner wall surfaces (22).

The multiple guide protrusion (110) can be formed to be symmetric with respect to a central axis of the holder member (20). For an example, each inner wall surface (22) of the accommodation (21)-side includes two guide protrusions (110), so that a total of eight protrusions can be formed to be symmetric with respect to the central axis, as shown in FIG. 2, when the holder member (20) is formed in a hexahedral shape. When the image sensor is inserted using the mentioned above guide protrusion (110), the insertion of the image sensor (11) under a rotational state with respect to the central axis can be protected, by installing the central axis to be concentric using the guide protrusion (110).

On the one hand, each inner wall surface (22) can be comprised of one or multiple guide units (100). Also, the guide units (100) formed at each inner wall surface (22) may be formed to be symmetric or to be asymmetric each other. Also, the guide unit (100) may be formed at all four inner wall surfaces (22) or at some of the inner wall surfaces (22). For example, as shown in FIG. 2, the guide unit (100) may be formed at all the inner wall surfaces (22), but may also be formed at only one, two, or three of the inner surfaces. The slope (120) as an end portion of the guide protrusion (110), as shown in FIG. 1 and FIG. 2, can be formed at a position where the image sensor (11) is inserted. A side wall surface and an end portion of the image sensor (11) have a direct contact with the slope (120) and are slipped over on the slope (120), resulting in a smooth insertion between them, although the image sensor (11) is inserted under a situation that the position of the central axis of the image sensor (11) is no longer along the central axis of the holder member (20).

On the one hand, a height (H) of the mounting portion (21) arranged in the holder member (20), as shown in FIG. 1, can be formed corresponding to one of the image sensor (11). For such a configuration, an upper surface of the image sensor (11) has a surface contact with a corresponding support surface (23) (refer to FIG. 2) of the mounting portion (21) arranged in the holder member (20), wherein the contact surface can then be bonded with adhesive, and the like, which may be an elastic epoxy, and the like, and additional holder member may be required in addition to the adhesive.

Hereafter, an assembly order for the camera module is described according to an embodiment of the present invention.

Above all, an image sensor (11) can be maintained to be fixed by mounting on a surface of the printed circuit board (10) using a solder or a wire bonding, and the like. After the image sensor (11) is completely fixed on the printed circuit board (10), a lens module (30) can be inserted and coupled in the holder member (20). The holder member (20) and the lens module (30) are then assembled to be concentric between an optical axis and a central axis. After assembling the lens module (30), the image sensor (11) can be inserted and coupled in the mounting portion (21) by installing the mounting portion (21) to be opposite to the image sensor (11).

A guide unit (100) formed protruding from the inner wall surface (22) of the accommodation (21) in the holder member (20) then guides the last stage and side wall surface of the image sensor (11), a central axis of the image sensor (11) and a central axis of the holder member (20) and lens module (30) can be hereby assembled to be concentric.

On the one hand, in the embodiment, the image sensor (11) can be assembled after a holder member (20) and a lens module are firstly assembled, which is not limited thereto, but it is also possible that the lens module (30) can be assembled after the image sensor (11) and holder member (20) are firstly assembled. Like this, an assembly order for the holder member (20), image sensor (11) and lens module (30) may variously be modified, as needed.

On the one hand, in the embodiment, an embodiment was given to illustrate a case that two of the guide protrusions (110) can be formed protruding from each inner wall surface (22), which is not limited thereto, but it is also possible that each inner wall surface may be comprised of one or at least three protrusions as needed.

Although embodiments of the present invention have been described with reference to a number of illustrative embodiments thereof, it should be understood that numerous other modifications and embodiments can be advised by those skilled in the art that will fall within the spirit and scope of the principles of this disclosure. More particularly, various variations and modifications are possible in the component parts and/or arrangements of the subject combination arrangements within the scope of the disclosure, the drawings and the appended claims. In addition to variations and modifications in the components parts and/or arrangements, alternative uses will also be apparent to those skilled in the art.

INDUSTRIAL APPLICABILITY

The present invention is suitable for use of a camera module equipped to miniature electronic equipment such as a mobile phone, tablet PC and so on.

The invention claimed is:
1. A camera module comprising:
a printed circuit board;
an image sensor mounted on an upper surface of the printed circuit board;
a holder member disposed on the upper surface of the printed circuit board and including a mounting portion formed at an inner side and accommodating the image sensor;
a lens module disposed in the holder member; and
a guide unit inwardly protruding from an inner wall surface forming the mounting portion of the holder member, wherein the guide unit includes a first guide protrusion inwardly protruding from the inner wall surface, and a second guide protrusion spaced from the first guide protrusion and inwardly protruding from the inner wall surface.

2. The camera module according to claim 1, wherein the guide unit is formed in a body with the holder.

3. The camera module according to claim 1, wherein the guide unit is formed as an additional member in addition to the holder member.

4. The camera module according to claim 1, wherein the mounting portion has a height corresponding to that of the image sensor.

5. The camera module according to claim 1, wherein the guide unit comprises a slope gradually protruded from a bottom end to an upper end.

6. The camera module according to claim 4, wherein the first and second guide protrusions are formed to be concentric with respect to a central axis of the holder member.

7. The camera module according to claim 1, wherein the holder member includes a support surface facing a sensing surface of the image sensor.

8. The camera module according to claim 7, wherein the support surface contacts the sensing surface.

9. The camera module according to claim 8, wherein adhesive is bonded to the support surface.

10. The camera module according to claim 8, wherein an elastic member is disposed between the support surface and the sensing surface.

11. The camera module according to claim 7, wherein the holder member includes a support portion supporting a bottom surface of the lens module,
   wherein the image sensor is disposed under the support portion, and
   wherein the image sensor and the lens module are spaced from each other by the support portion.

12. The camera module according to claim 1, wherein the lens module includes at least one lens.

13. The camera module according to claim 1, wherein the guide unit is formed at only a portion of the inner wall surface of the holder member.

* * * * *